United States Patent
Benham

(10) Patent No.: US 6,902,668 B2
(45) Date of Patent: Jun. 7, 2005

(54) CHEMICAL DISPENSING APPARATUS

(76) Inventor: Roger A. Benham, P.O. Box 120830, San Diego, CA (US) 92112-0830

(*) Notice: Subject to any disclaimer, the term of this patent is extended or adjusted under 35 U.S.C. 154(b) by 295 days.

(21) Appl. No.: 10/270,106

(22) Filed: Oct. 15, 2002

(65) Prior Publication Data
US 2003/0070974 A1 Apr. 17, 2003

Related U.S. Application Data
(60) Provisional application No. 60/329,323, filed on Oct. 16, 2001.

(51) Int. Cl.$^7$ .............................................. B01D 11/02
(52) U.S. Cl. ...................... 210/206; 210/218; 422/266; 422/283
(58) Field of Search ............................. 210/198.1, 205, 210/206, 209, 218; 422/255, 256, 261, 266, 283; 222/180, 464.2

(56) References Cited

U.S. PATENT DOCUMENTS

| | | | | |
|---|---|---|---|---|
| 1,988,000 A | * | 1/1935 | Estler .......................... 422/266 |
| 2,419,845 A | * | 4/1947 | Layton ......................... 422/263 |
| 2,667,663 A | * | 2/1954 | Blasczyk .................... 264/123 |
| 2,758,877 A | * | 8/1956 | Gleason ....................... 422/113 |
| 3,195,558 A | * | 7/1965 | Franz et al. ................. 137/268 |
| 3,266,870 A | | 8/1966 | Cianflone, Jr. |
| 3,776,274 A | | 12/1973 | Riley |
| 3,876,544 A | * | 4/1975 | Fowler ..................... 210/198.1 |
| 4,063,663 A | * | 12/1977 | Larson et al. ................. 222/52 |
| 4,691,732 A | * | 9/1987 | Johnson et al. ............. 137/268 |
| 5,225,074 A | * | 7/1993 | Moini ......................... 210/169 |
| 5,913,327 A | | 6/1999 | Zhadanov et al. |
| 5,976,385 A | * | 11/1999 | King ........................... 210/754 |
| 6,221,321 B1 | * | 4/2001 | Fleischer et al. ........... 422/282 |
| 6,241,884 B1 | | 6/2001 | Hansen |
| 6,358,425 B1 | * | 3/2002 | King ........................... 210/764 |

* cited by examiner

Primary Examiner—Fred G. Prince
(74) Attorney, Agent, or Firm—Hoffman, Wasson & Gitler

(57) ABSTRACT

An chemical dispensing apparatus, which has a dispenser head member and a chemical holding container for holding chemical, the dispenser head member having a flow entry means for directing fluid flow into the chemical holding container and a flow exit means for directing fluid flow out of the chemical holding container, the flow entry means being in fluid connection with a center-mounted, elongated perforated tubular member extending at least partway into the chemical holding container, the chemical holding container having an opening which is releasably engageable with the dispenser head member for refilling.

14 Claims, 5 Drawing Sheets

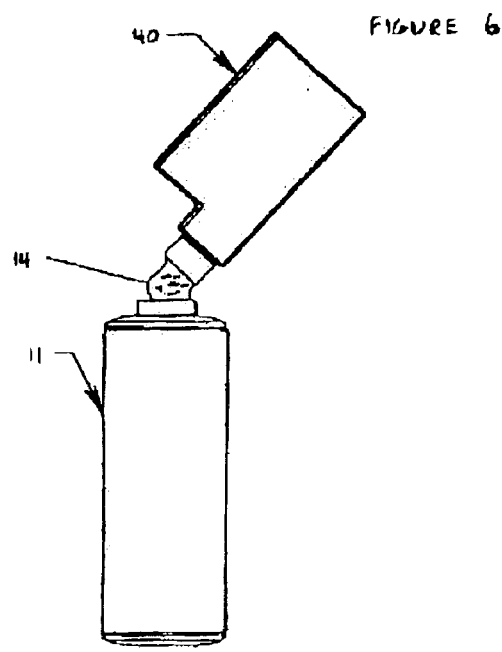
FIGURE 6
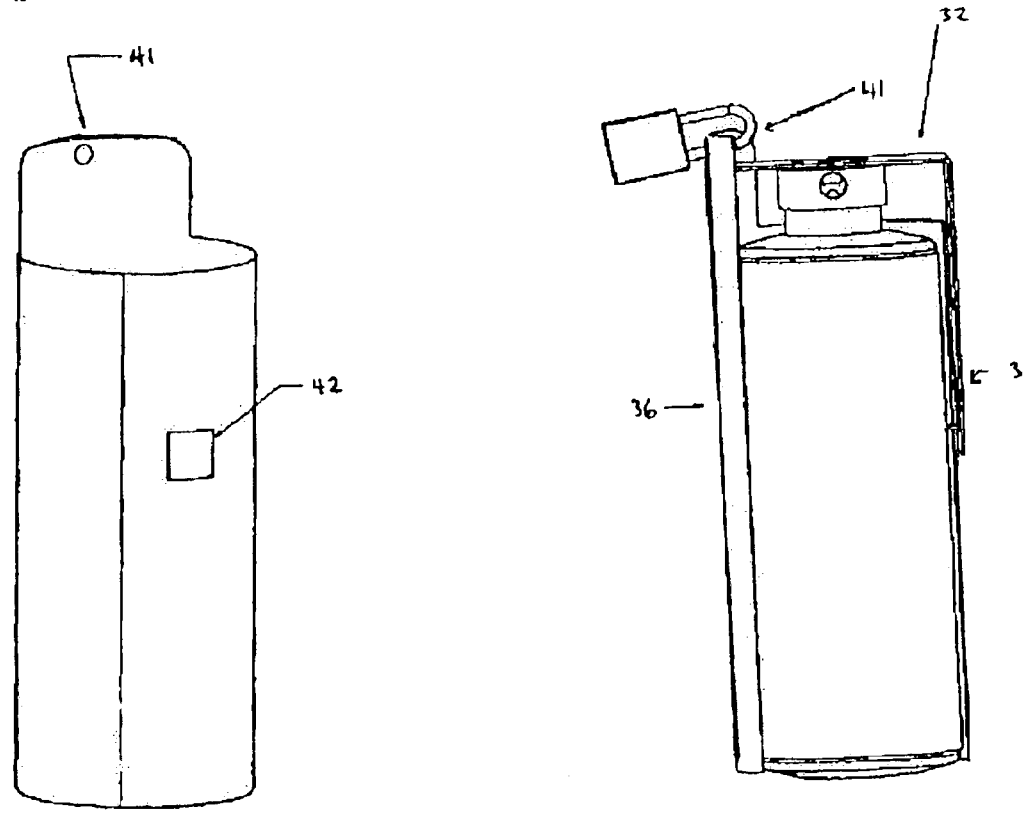
FIGURE 7
FIGURE 8

CHEMICAL DISPENSING APPARATUS

The present application is based upon U.S. provisional patent application Ser. No. 60/329,323, filed Oct. 16, 2001.

BACKGROUND OF THE INVENTION

1. Field of the Invention

The present invention relates to an improved chemical dispensing apparatus and in particular to a refillable dispensing apparatus for the chemical treatment of a fluid, a means for wall mounting the apparatus, a means for securing the apparatus, a means for flushing the apparatus, and a refilling means.

2. Discussion of Related Art

Many commercial and residential water supplies suffer from objectionable conditions. Often, treatment measures are implemented with the addition of chemical treatments to the water supply, including for example phosphate or silicate compounds. In order to provide effective treatment and to prevent other problems from occurring, it may be necessary to carefully meter the amount of chemical treatment agent to a given quantity of supplied water.

Systems for the chemical treatment of a liquid are known. U.S. Pat. No. 6,241,884 discloses a dispenser device including a dispenser head and threaded canister. A chemical container assembly disposed within the canister includes a support column, which telescopically receives a chemical container. The chemical container includes inlet and outlet holes to allow a flow through the container to come into contact and subsequently dissolve chemical treatment material disposed within the container. The support column engages the dispenser head to aid in defining the separation distance between the dispenser head and the outlet hole of the chemical container.

Other configurations are also known. A device for introducing substances into water as described in U.S. Pat. No. 5,913,327 is known. The device comprises a water supply element having a throughgoing passage, one end connectable with a water source and another end connectable with a water discharge element so that water passes from the water source through the throughgoing passage to the water discharge element. It also comprises a substance supply element having one end connectable with a substance containing element and another end turnably connectable with the water supply element in an open position in which a communication is established between an interior of the substance supply element and the water supply element for supply of a substance from the container through the substance supply element into the water supply element, and a closed position in which the communication is interrupted so that the substance is no longer supplied from the substance supply element into the water supply element.

A third type of known apparatus is disclosed in U.S. Pat. No. 5,580,448. This citation teaches an apparatus for dispensing a measured amount of a chemical into a fluid piping system comprising a cap having fluid entrance and exit ports between which is a tubular flow conduit. The tubular flow conduit has a first passageway therein to divert a portion of the fluid passing through the system into a canister attached to the cap. A container is disposed within the canister containing a solid chemical, which is partially dissolved by fluid introduced into the container. A portion of the dissolved chemical passes out through a second passageway in the tubular flow conduit located downstream from the first fluid passageway and is reintroduced into the fluid system.

A fourth type of known apparatus is disclosed in U.S. Pat. No. 3,266,870. The citation teaches an apparatus for forming a saturated chemical solution comprising a container connected into an unsaturated liquid supply system so as to receive bypass liquid therefrom, said container having therein a supply of dry chemical having an exposed upper surface; a manifold head forming the top closure of said container and having a removable cap, inlet and outlet ports therein communicating with the interior of said container; means for supplying unsaturated bypass liquid to said inlet port; a tube connected to said inlet port to receive said bypass liquid therefrom, said tube extending downwardly from said inlet port and vertically through the body of dry chemical within said container and terminating adjacent the bottom portion of said container; said tube having a plurality of vertically spaced, downward slanted perforations extending over the greater portion of the length thereof, the perforations above the exposed upper surface of the dry chemical within said container adapted to spray said unsaturated bypass liquid in a wide arch over a substantial portion of said exposed upper surface of said dry chemical to permit intimate contact between said liquid and said exposed upper surface to form a saturated solution, successive ones of said perforations being uncovered by the dissolution of the dry chemical at the exposed upper surface thereof as said bypass liquid is sprayed thereon so that said dissolution of said dry chemical at the exposed upper surface thereof is effected regardless of the level of said dry chemical in said container, following which said saturated bypass liquid passes out to said liquid supply system through said outlet port.

The abovementioned dispenser designs all have their shortcomings. The present invention is designed to be easier to install, easier to service, more versatile in application (able to dispense solid, granular, powdered and liquid chemicals), and lends itself to mail-order servicing. The refillable aspect is particularly important for a reduction in cost to the consumer.

BRIEF SUMMARY OF THE DISCLOSURE

The present invention is directed to an improved chemical dispensing apparatus, which may at least partially overcome the abovementioned disadvantages or provide the consumer with a useful or commercial choice.

In one form the invention resides in an improved, chemical dispensing apparatus, which has a dispenser head member and a chemical holding container, the dispenser head member having a flow entry means for directing fluid flow into the chemical holding container and a flow exit means for directing fluid flow out of the chemical holding container, the flow entry means being in fluid connection with a center-mounted, elongated perforated tubular member extending at least partway into the chemical holding container, the chemical holding container having an opening which is releasably engageable with the dispenser head member for refilling.

In another form the invention resides in an improved, chemical dispensing apparatus, which has a dispenser head member and a chemical holding container, the dispenser head member having a flow entry means for directing fluid flow into the chemical holding container and a flow exit means for directing fluid flow out of the chemical holding container, the flow entry means being in fluid connection with an elongated perforated tubular member extending at least partway into the chemical holding container, the chemical holding container having an opening which is releasably engageable with the dispenser head member for refilling, and a means for refilling the chemical holding container.

In yet another form the invention resides in an improved, chemical dispensing apparatus, which has a fixed dispenser head member and a removable chemical holding container, the fixed dispenser head member having a flow entry means for directing fluid flow into the chemical holding container and a flow exit means for directing fluid flow out of the chemical holding container, the flow entry means being in fluid connection with a center-mounted, elongated perforated tubular member extending at least partway into the chemical holding container, the removable chemical holding container having an opening which is releasably engageable with the fixed dispenser head member for refilling.

In still another form the invention resides in an improved, chemical dispensing apparatus, which has a fixed dispenser head member and a removable chemical holding container, the fixed dispenser head member having a flow entry means for directing fluid flow into the chemical holding container and a flow exit means for directing fluid flow out of the chemical holding container, the flow entry means being in fluid connection with an elongated perforated tubular member extending at least partway into the chemical holding container, the removable chemical holding container having an opening which is releasably engageable with the fixed dispenser head member for refilling, and a means for refilling the removable chemical holding container.

The improved, chemical dispensing apparatus described herein may be termed a "bypass type" dispenser.

The fixed dispenser head member may preferably have a venting or purging means for venting or purging in fluid connection with the exit flow means for directing fluid flow out of the chemical holding container.

Bypass type dispensers typically require regular flushing. Insoluble components of the chemical products used in the dispensers tend to cake-up, or become mushy, and clog the dispenser fittings and tubing. It is important to note here that in typical dispensers, the tank or chemical holding container is fixed and the cap is removable. Typically, flushing requires that the cap be removed and a siphon be drawn while fresh water from an inlet be used to flush out the undesirable waste products.

Preferably, the venting or purging means may allow an operator to flush out the dispenser without having to open or remove the chemical holding container. It is anticipated that by closing or otherwise obstructing the exit flow means and opening the inlet flow means, the venting or purging means may allow flushing of the dispenser.

Preferably the fixed dispenser head member may have an adjustment means for the adjustment of the chemical addition rate to the main flow stream pipe, in fluid connection with the exit flow means for directing fluid flow out of the chemical holding container.

Preferably the means for refilling the chemical holding container is a bottle or pouch having pouring means for pouring the chemical into the chemical holding container, the pouring means being engageable with the opening of the chemical holding container. In a most preferred form, the means for refilling the chemical holding container may be a stand-up zip pouch of the type described in WO9118797 or EP0620156. A pouch of this general kind may preferably be adapted to allow direct filling of the chemical holding container.

In another form, the invention resides in an assembly which comprises a chemical dispensing apparatus, which has a dispenser head member and a chemical holding container, the dispenser head member having a flow entry means for directing fluid flow into the chemical holding container and a flow exit means for directing fluid flow out of the chemical holding container, the flow entry means being in fluid connection with a elongated perforated tubular member extending at least partway into the chemical holding container, the chemical holding container having an opening which is releasably engageable with the dispenser head member for refilling, and a mounting means, the dispenser head member having attachment means for attachment to the mounting means, the mounting means comprising a first leg member adapted for attachment to a mount and a second leg member adapted to attach to the dispenser head.

The first leg member preferably has a hook-shaped extension and the second leg member preferably has a flange having a hole at the terminus furthest from the first leg. The hook shaped extension may also serve to maintain the chemical holding container in an unangled orientation with respect to the first leg member by abutting the chemical holding container. Without the contact between the hook shaped extension and the chemical holding container, the container may tend to sag and appear unsightly. Any sagging may also impose different or larger forces or torque on the mounting means. The mounting means may therefore have to be manufactured to be much larger and use more material.

The mounting means may preferably be attached to a support. This attachment may be accomplished using screws or bolts. If the dispenser is to be mounted onto a pipe, notches may be added to the first leg of the mounting means to allow hose or reducing diameter clamps to be used.

The mounting means may comprise a flat steel strip and may be "L"-shaped.

Preferably the chemical dispensing apparatus has a removable enclosure at least partially surrounding the apparatus, the enclosure having at least two holes, the first hole for engaging with a flange on the second leg of the mounting means, and the second hole for engaging with the hook-shaped extension on the first leg of the mounting means.

The chemical dispensing apparatus as described herein shall preferably be used as a part of a chemical dispensing system comprising a main flow stream pipe in which the fluid to be treated flows in one determined direction. For the purposes of introducing fresh untreated liquid to the chemical dispenser, the dispenser is fitted with a fixed dispenser head member, which has an inlet port and an outlet port. The inlet port is connected by a suitable conduit to the upstream side of the pipe. In a like manner, the outlet port is connected to the downstream side of the pipe by means of a conduit. There is generally a pressure differential across the upstream and downstream sides of the main flow stream pipe causing a diversion of a part of the fluid in the main flow stream pipe through the chemical dispenser. This is generally known as "bypass" type chemical addition. The fluid is treated with the chemical and then reintroduced to the main flow stream pipe.

BRIEF DESCRIPTION OF THE DRAWINGS

FIG. 6 shows an elevation view of a preferred aspect of a refillable chemical holding container and bottle means for refilling and showing the engageable pouring means.

FIG. 7 shows an elevation view of the preferred aspect of an open-ended, removable enclosure for surrounding the chemical dispensing apparatus.

FIG. 8 shows an elevation view of an open-ended, removable enclosure for surrounding the chemical dispensing apparatus in place showing the engagement with the mounting means flange and hook-shaped extension.

DETAILED DESCRIPTION

Figure 1:
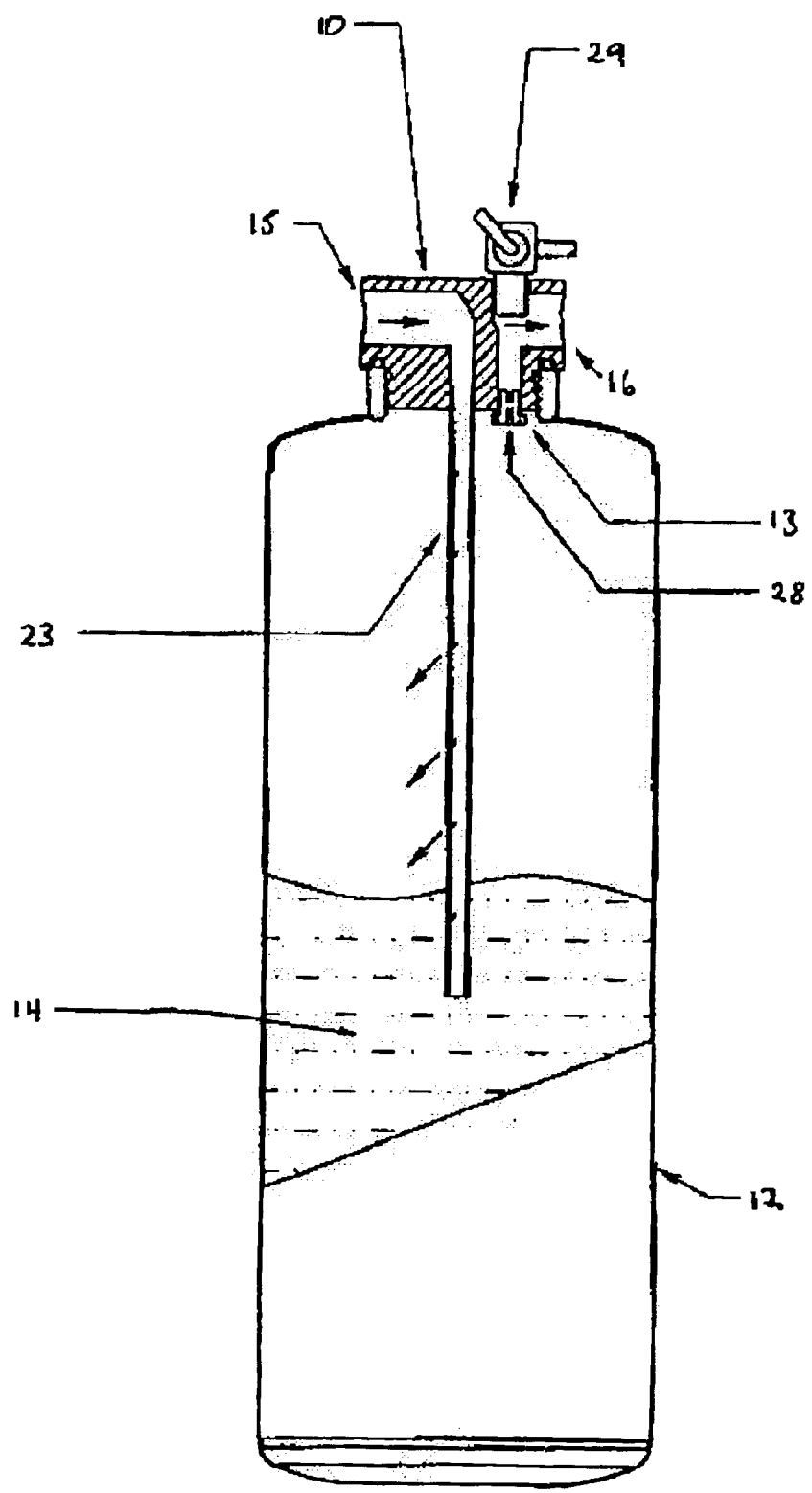
FIG. 1 shows an elevation view of a sectioned chemical dispensing apparatus.
Figure 2:
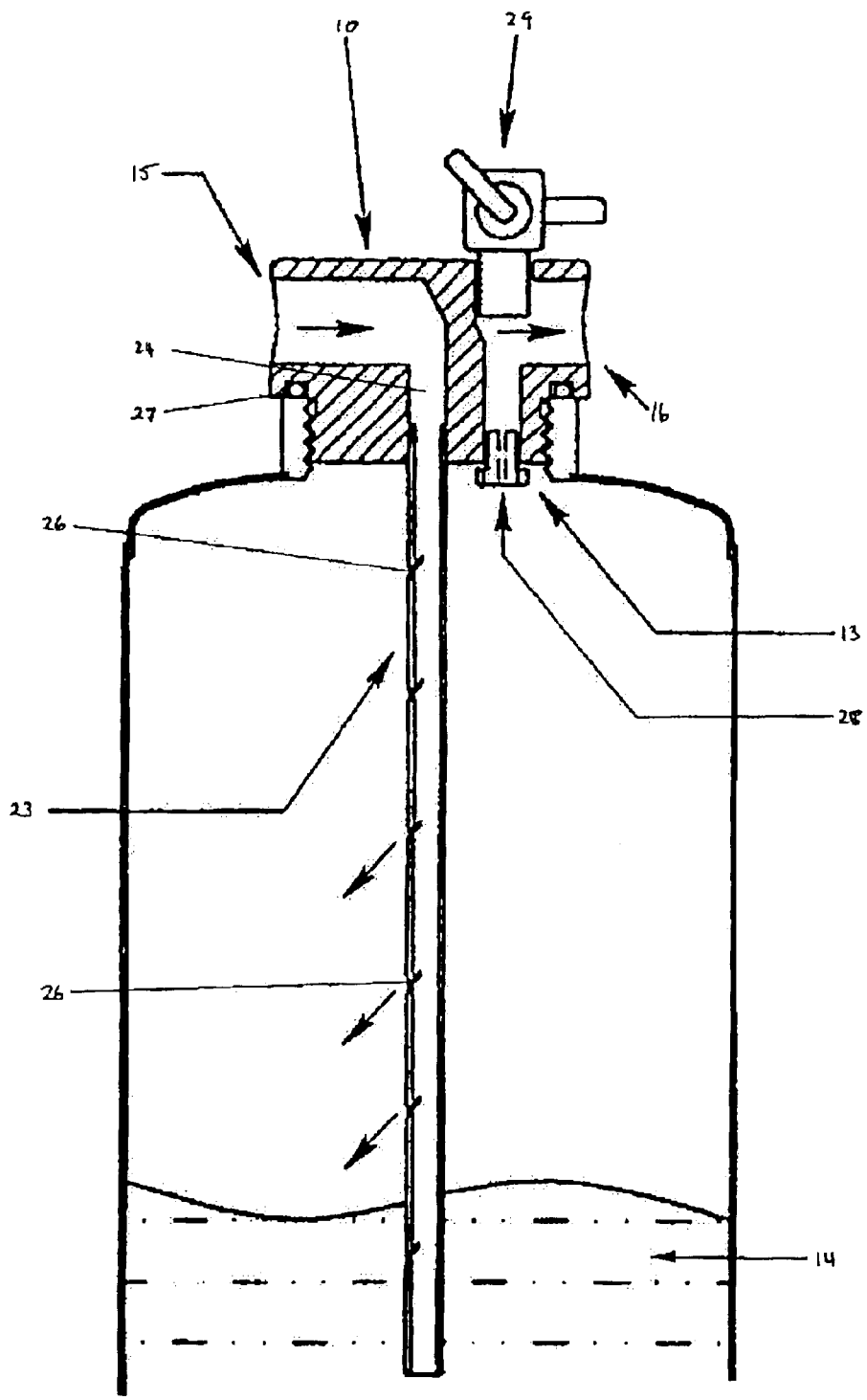
FIG. 2 shows an enlarged elevation view of the upper section of the chemical dispensing apparatus.

With reference to FIGS. 1 through 8, the chemical dispensing apparatus 30 is there illustrated which exemplifies the present invention. The apparatus as shown comprises a fixed dispenser head member 10, and a removable chemical holding container 11.

The chemical holding container 11 illustrated comprises a reservoir 12, preferably formed of stainless steel to prevent deterioration as a result of housing chemicals. The reservoir 12 is suitably cylindrical in shape. The chemical holding container 11 will be between 10 cm and 200 cm in length and have a diameter between 5 cm and 50 cm.

The top of the chemical holding container 11 has a collar having an opening 13. This opening 13 is internally threaded to receive the fixed dispenser head member 10 which is to be screwed into the opening 13. The threading engagement forms a seal, which is a pressurised seal, and therefore be substantially watertight as well. There may be other means attached to the seal such as an O-ring 23 in order to supplement this seal to ensure that the seal functions as required.

The chemical to be dispensed 14 is deposited in the chemical holding container 11 through the opening 13, and this opening shall also be the point at which refilling takes place. The chemical may comprise a solid, liquid, gel or mixture to treat the passing fluid. Preferably, the chemical is a flowable material, for instance a scale-inhibiting or corrosion-inhibiting material.

The fixed dispenser head member 10 is screwed into the opening 13 after installation, refilling and during operation. The fixed dispenser head member 10, is preferably constructed of stainless steel and has a diameter corresponding to the opening in the collar of the chemical holding container 11. In order to introduce the fluid to be treated into the chemical holding container 11, and for removal of the treated fluid, the fixed dispenser head member 10 is provided with an inlet port 15 and an outlet port 16. The inlet port 15 is connected by a suitable conduit 17 to the upstream side of a main flow stream pipe 18. The outlet port 16 is connected to the downstream side of the main flow stream pipe 18, also by a suitable conduit 19.

The inlet port 15 of the fixed dispenser head member 10, is in fluid connection with a center-mounted, elongate, perforated tubular member 23, which extends at least partway into the chemical holding container 11. The tube 23 is generally fitted into a passage 24, fluidly connected to the inlet port 15 by any suitable means. The tube 23 extends at least partially towards the base 25 of the chemical holding container 11. In practice the tube 23 would extend a substantial distance into the chemical holding container 11 toward of the base 25 of the chemical holding container 11.

The perforations 26 in the tube are spaced at regular intervals, beginning at the top of the tubular member 23 and continuing to a point near the bottom of the tubular member 23. The perforations 26 are downward sloping at a small declination from the horizontal. These perforations 26 will be successively uncovered as the level of the chemical to be dispensed 14 drops from its initial high level in the chemical holding container 11.

The dispenser head member 10 also has an orifice fitting 28 in fluid connection with the outlet port 16. The orifice fitting 28 is preferably used for fine adjustment of the feed rate of treated fluid to the main flow stream pipe 18. The orifice fitting 28 will preferably be fitted to the outlet port 16 by means of a threaded section and it shall preferably be connected, by this threaded section, to the underside of the dispenser head member 10, so that when the dispenser head member 10 is screwed into the opening 13, the orifice fitting shall be positioned inside the chemical dispensing container 11.

Also, the dispenser head member 10 will preferably have a venting or purging means for venting or purging, in fluid connection with the outlet port 16. This venting or purging means shall preferably be a bleed valve 29, which is threadingly attached to the upper face of the dispenser head member 10. The bleed valve 29 provides a venting means for releasing the pressure build-up in the chemical dispensing apparatus 30 after use and prior to removal of the chemical holding container 11 for refilling. It would also be used to vent any gas trapped within the chemical dispensing apparatus 30 after refilling and prior to the introduction of the untreated fluid flow.

Figure 5:
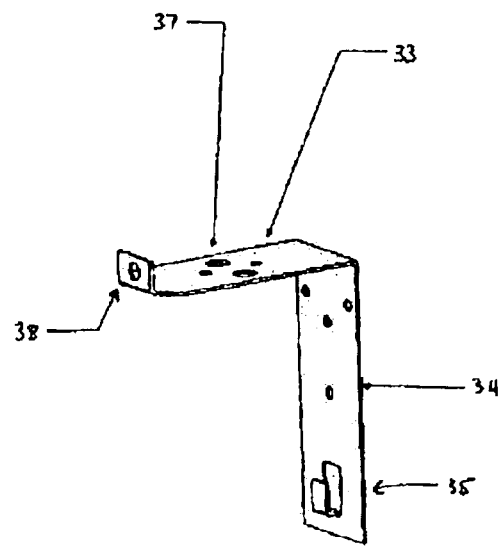
FIG. 5 shows an isometric view of the mounting means.

The fixed dispenser head member 10 shall also preferably have an attachment means for attaching to an "L"-shaped mounting means 32 as shown in FIG. 5. The mounting means 32 is a device with a first leg 34 and a second leg 33, which are substantially perpendicular to each other.

The first leg 34 will be adapted for mounting on a sufficiently strong support such as a wall or pillar. The first leg 34 will also possess a hook-shaped extension 35, located coplanar to the first leg 34 on the face opposite to the support. This extension 35 is for the engagement with a removable enclosure 36.

The second leg 33 of the mounting means 32 has attachment means 37 for attaching to the dispenser head member 10. The attachment means 37 will preferably be holes for receiving screws or bolts in order to secure the dispenser head member 10 to the mounting means 32.

The second leg 33 of the mounting means 32 will also possess a flange 38 having a hole 39. The flange 38 will be a raised extension formed at the terminus of the second leg 33 furthest from the first leg 34. The hole 39 shall be drilled through the flange 38 and will engage with the removable enclosure 36.

The means for refilling the chemical holding container 10 is a bottle or pouch 40 as shown in FIG. 6. The bottle or pouch 40 will have an opening that is engageable with the opening 13 of the chemical holding container 11, such that the chemical to be dispersed 14 can be poured from the bottle or pouch 40 into the chemical holding container 11 with substantially no spillage and without the use of a funnel or equivalent device. The bottle or pouch 40 will preferably be manufactured from a lightweight material suitable for containing the chemical to be dispersed 14 and also suitable for transport by media such as the postal service, delivery service, and airfreight.

The removable enclosure 36 will be designed to cover the chemical dispensing apparatus 30 and to prevent damage to or tampering with the chemical dispensing apparatus 30. The enclosure 36 shall be manufactured of a suitable material, preferably steel of some type, and be open ended to facilitate its placement around the apparatus. The enclosure 36 shall have at least two holes, the first hole 41 for engaging with the flange 38 on the second leg 33 of the mounting means 32, and the second hole 42 for engaging with the hook-shaped extension 35 on the first leg 34 of the mounting means 32. The holes shall be shaped accordingly. The first hole 41 is preferably round in order to receive the "U"-shaped shackle of a padlock.

Figure 3:
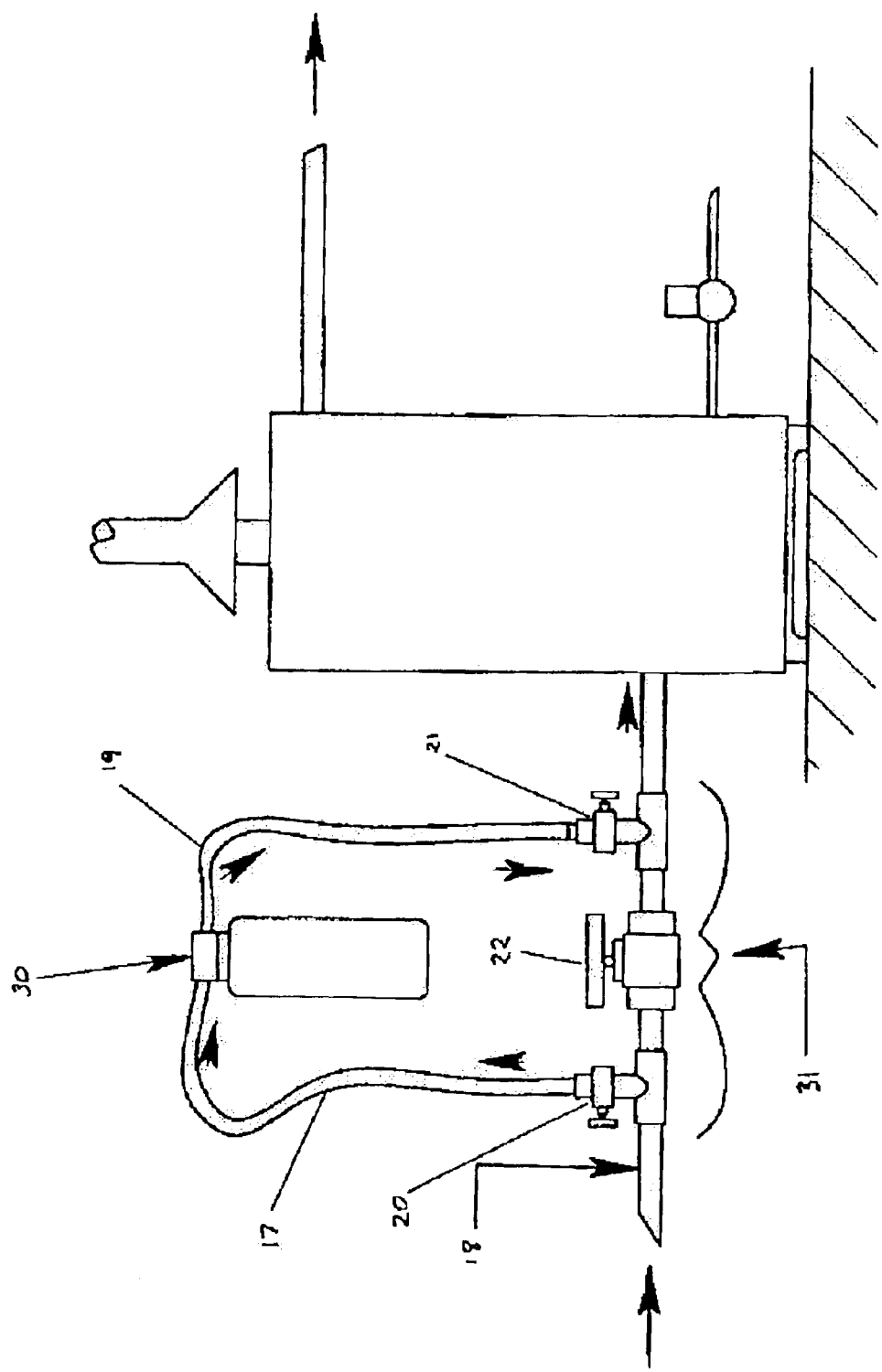
FIG. 3 shows an elevation view of the chemical dispensing apparatus in position in a chemical dispensing system connected to a hot water heater.
Figure 4:
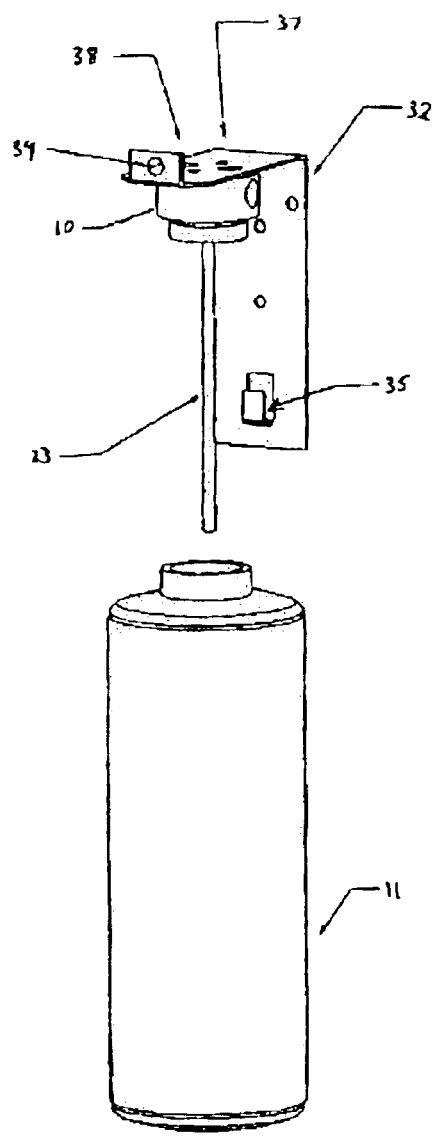
FIG. 4 shows an isometric view of a chemical dispensing apparatus with the preferred aspect of an "L"-shaped connected mounting means.

As illustrated in FIG. 3, the chemical dispensing system 31 is also provided with a pair of valves 20, 21, to provide control of the velocity and therefore the amount of fluid passing through the chemical dispensing system 31. There shall be one valve located on the inlet conduit 17 and one valve on the outlet conduit 19.

These valves are sufficiently sensitive to provide an accurate control over both the flow of untreated fluid to the chemical dispensing apparatus 30 and the quantity of treated fluid being removed from the outlet port 16 of the chemical dispensing apparatus 30 and being reintroduced to the main flow stream pipe 18. They would also provide a means for stopping the flow and isolating the chemical dispensing apparatus 30 for removal or maintenance purposes.

Generally, in order to provide the chemical dispensing apparatus 30 with a flow of fluid in the desired direction, a restriction is provided in the main flow stream pipe 18, which creates a pressure differential across the inlet and the outlet of the chemical dispensing apparatus 30 directing the fluid flow in the direction desired. In the FIG. 3, a system is shown as an example where the restriction is a restriction valve 22. The restriction may equally be a venturi or any other means for inducing a pressure differential across the system.

The above describes the general operation of a bypass type chemical dispensing system. Unique to the present invention is the configuration of the fixed dispenser head member 10 and the removable chemical holding container. Also the refillable nature of the dispensing system is seen as unique.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the description appropriately interpreted by those skilled in the art. For instance, the apparatus may hold material, which treats the fluid by absorption or reaction on one or more component in the fluid.

What is claimed is:

1. A bypass chemical dispensing apparatus, which has a dispenser head member and a chemical holding container for holding chemical, the dispenser head member having a flow entry means for directing fluid flow into the chemical holding container and a flow exit means for directing fluid flow out of the chemical holding container, the flow entry means being in fluid connection with a center-mounted, elongated perforated tubular member extending at least partway into the chemical holding container, the chemical holding container having an opening which is releasably engageable with the dispenser head member for refilling and wherein the dispenser head member further has a venting or purging means in fluid connection with the flow exit means for venting or purging the dispensing apparatus.

2. The chemical dispensing apparatus according to claim 1, further comprising a means for refilling the chemical holding container.

3. The chemical dispensing apparatus according to claim 1, wherein the dispenser head member is fixed to a support and the chemical holding container is adapted for removal therefrom.

4. The chemical dispensing apparatus according to claim 2, wherein the dispenser head member is fixed to a support and the chemical holding container is adapted for removal therefrom.

5. The chemical dispensing apparatus according to claim 4, wherein the means for refilling the chemical holding container is a bottle or pouch having pouring means for pouring the chemical into the chemical holding container, the pouring means being engageable with the opening of the chemical holding container.

6. The chemical dispensing apparatus according to claim 1, wherein the dispenser head member has an adjustment means for the adjustment of the chemical addition rate, in fluid connection with the exit flow means.

7. The chemical dispensing apparatus according to claim 1, further comprising a mounting means, the dispenser head member having attachment means for attachment to the mounting means, the mounting means comprising a first leg member adapted for attachment to a mount and a second leg member adapted to attach to the dispenser head.

8. The chemical dispensing apparatus according to claim 7, wherein the first leg member has a hook-shaped extension and the second leg member has a flange having a hole at the terminus furthest from the first leg, the hook shaped extension adapted to abut the chemical holding container.

9. The chemical dispensing apparatus according to claim 8, further comprising a removable enclosure at least partially surrounding the apparatus, the enclosure having at least two holes, the first hole for engaging with a flange on the second leg of the mounting means, and the second hole for engaging with the hook-shaped extension on the first leg of the mounting means.

10. The chemical dispensing apparatus according to claim 1, used as a part of a chemical dispensing system comprising a main flow stream pipe in which the fluid to be treated flows in one determined direction, wherein the flow entry means is connected by a suitable conduit to the upstream side of the pipe, the flow exit means is connected to the downstream side of the pipe by means of a conduit, and there is a pressure differential across the upstream and downstream sides of the main flow stream pipe causing a diversion of a part of the fluid in the main flow stream pipe through the chemical dispenser.

11. The chemical dispensing apparatus according to claim 1, wherein the chemical holding container holds a gel.

12. The chemical dispensing apparatus according to claim 11, wherein the gel in the chemical holding container is a phosphate gel.

13. The chemical dispensing apparatus according to claim 11, wherein the gel in the chemical holding container is a silicate gel.

14. The chemical dispensing apparatus according to claim 1, wherein the tubular member has an open lower end.

* * * * *